United States Patent
Moyer

(10) Patent No.: US 8,918,707 B2
(45) Date of Patent: Dec. 23, 2014

(54) CODEWORD ERROR INJECTION VIA CHECKBIT MODIFICATION

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 206 days.

(21) Appl. No.: 13/533,645

(22) Filed: Jun. 26, 2012

(65) Prior Publication Data

US 2013/0346798 A1    Dec. 26, 2013

(51) Int. Cl.
*G06F 11/00* (2006.01)

(52) U.S. Cl.
USPC .......................................... 714/807; 714/801

(58) Field of Classification Search
CPC .... G06F 11/2215; G06F 11/261; G06F 11/28
USPC ......... 714/54, 41, 43, 703, 701, 752, 27, 807, 714/801
See application file for complete search history.

(56) References Cited

U.S. PATENT DOCUMENTS

| | | | |
|---|---|---|---|
| 4,897,839 A | 1/1990 | Yamagishi et al. | |
| 5,099,484 A | 3/1992 | Smelser | |
| 5,872,790 A | 2/1999 | Dixon | |
| 5,872,910 A * | 2/1999 | Kuslak et al. | 714/41 |
| 5,954,831 A | 9/1999 | Chang | |
| 6,182,248 B1 * | 1/2001 | Armstrong et al. | 714/43 |
| 6,539,503 B1 * | 3/2003 | Walker | 714/703 |
| 6,622,268 B2 * | 9/2003 | Holman | 714/701 |
| 6,751,756 B1 * | 6/2004 | Hartnett et al. | 714/54 |
| 6,799,287 B1 | 9/2004 | Sharma et al. | |
| 7,266,735 B2 | 9/2007 | Hirabayashi | |
| 7,506,226 B2 | 3/2009 | Gajapathy et al. | |
| 2004/0243887 A1 | 12/2004 | Sharma et al. | |
| 2006/0031739 A1 | 2/2006 | Gan et al. | |
| 2007/0266297 A1 | 11/2007 | Liang et al. | |
| 2009/0100315 A1 | 4/2009 | Lee | |
| 2013/0326302 A1 * | 12/2013 | Han et al. | 714/752 |

\* cited by examiner

*Primary Examiner* — David Ton
(74) *Attorney, Agent, or Firm* — Yudell Isidore PLLC

(57) ABSTRACT

A technique for injecting errors into a codeword includes generating a codeword that includes data bits and one or more checkbits. One or more bit errors are injected into the codeword by modifying at least one of the one or more checkbits.

20 Claims, 6 Drawing Sheets

FIG. 2

| 0 | RCHKBIT | 0 | WRC | INVC | 0 | WCHKBIT/CHKINVT |
|---|---|---|---|---|---|---|
| 0 1 2 3 4 5 | 6 7 8 9 10 11 | 12 13 14 15 | 16 17 | 18 19 | 20 21 22 23 | 24 25 26 27 28 29 30 31 |

FIG. 4

| BITS | NAME | DESCRIPTION |
|---|---|---|
| 0:3 | - | THESE BITS ARE RESERVED |
| 4:11 | RCHKBIT | READ CHECKBITS<br>THIS FIELD PROVIDES THE RAW CHECKBITS RECEIVED ON THE LAST CPU DATA ACCESS TO THE DMEM OR TO EXTERNAL MEMORY VIA THE DATA BIU. THIS FIELD CORRESPONDS BIT-WISE TO P_HRCHKBIT[7:0], FOR EXTERNAL READS. SOFTWARE MAY USE THIS INFORMATION TO DETERMINE THE STORED CHECKBITS OF EXTERNAL MEMORIES OR THE DMEM BY PERFORMING CPU LOAD OPERATIONS AND THEN ACCESSING THIS FIELD PRIOR TO THE NEXT LOAD OPERATION (ASSUMING INTERRUPTS ARE MASKED) |
| 12:15 | - | THESE BITS ARE RESERVED |
| 16:17 | WRC | WRITE CONTROL<br>00 - NO WRITE CHECKBIT SUBSTITUTION IS PERFORMED BY THIS CONTROL BIT<br>01 - CHECKBIT SUBSTITUTION IS PERFORMED FOR THE NEXT CPU EXTERNAL WRITE ACCESS (ONLY) BY DRIVING P_HWCHKBIT[7:0] WITH THE VALUES IN THE WCHKBIT CONTROL FIELD. SOFTWARE MUST CLEAR THIS FIELD BEFORE RE-WRITING TO 01 IN ORDER TO GENERATE A SUBSEQUENT CHECKBIT SUBSTITUTION OPERATION.<br>10 - CHECKBIT SUBSTITUTION IS PERFORMED FOR EACH CPU EXTERNAL WRITE ACCESS WHILE THIS FIELD REMAINS SET TO 10 BY DRIVING P_HWCHKBIT[7:0] WITH THE VALUES IN THE WCHKBIT CONTROL FIELD. THIS FIELD MUST BE CLEARED BY SOFTWARE TO DISCONTINUE FURTHER CHECKBIT SUBSTITUTION.<br>11 - RESERVED<br>NOTE: CHECKBIT SUBSTITUTION HAS PRIORITY OVER ERROR INJECTION |
| 18:19 | INVC | INVERT CONTROL<br>00 - NO ERROR INJECTION IS PERFORMED BY THIS CONTROL BIT<br>01 - ERROR INJECTION IS PERFORMED FOR THE NEXT CPU EXTERNAL WRITE ACCESS (ONLY) BY MODIFYING P_HWCHKBIT[7:0] BASED ON CHKINVT. SOFTWARE MUST CLEAR THIS FIELD BEFORE RE-WRITING TO 01 IN ORDER TO GENERATE A SUBSEQUENT ERROR INJECTION OPERATION.<br>10 - ERROR INJECTION IS PERFORMED FOR EACH CPU EXTERNAL WRITE ACCESS WHILE THIS FIELD REMAINS SET TO 10 BY MODIFYING P_HWCHKBIT[7:0] BASED ON CHKINVT. THIS FIELD MUST BE CLEARED BY SOFTWARE TO DISCONTINUE FURTHER ERROR GENERATION.<br>11 - RESERVED<br>NOTE: CHECKBIT SUBSTITUTION HAS PRIORITY OVER ERROR INJECTION |

FIG. 5

| BITS | NAME | DESCRIPTION |
|---|---|---|
| 20:23 | - | THESE BITS ARE RESERVED |
| 24:31 | WCHKBIT/ CHKINVT | WRITE CHECKBITS / CHECKBIT INVERT MASK<br>THIS FIELD PROVIDES THE CHECKBIT SUBSTITUTION VALUES WHEN PERFORMING CHECKBIT SUBSTITUTION VIA THE WRC CONTROL FIELD, AND CONTROLS WHICH CHECKBITS ARE INVERTED WHEN PERFORMING ERROR INJECTION VIA THE INVC CONTROL FIELD. THIS FIELD CORRESPONDS BIT-WISE TO P_HWCHKBIT[7:0].<br>FOR CHECKBIT INVERSION OPERATIONS VIA ERROR INJECTION:<br>0 - CHECKBIT IS DRIVEN NORMALLY<br>1 - CHECKBIT IS INVERTED BEFORE BEING DRIVEN OUT ON P_HWCHKBIT[7:0] WHEN ERROR INJECTION OCCURS. |

FIG. 6

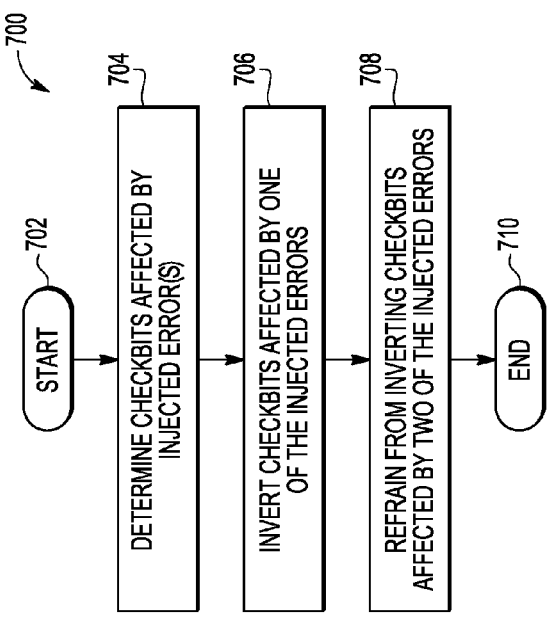

FIG. 7

CODEWORD ERROR INJECTION VIA CHECKBIT MODIFICATION

BACKGROUND

1. Field

This disclosure relates generally to codeword error injection and, more specifically, to codeword error injection via checkbit modification.

2. Related Art

In general, memory units that are protected by error correcting code (ECC) have generated and checked additional error parity information (that is local to the memory units) to detect and correct errors in data stored in the memory units. In contrast, end-to-end ECC (e2eECC) performs error protection code generation at a data generation source, sends data and error protection codes (i.e., a codeword) to intermediate storage when a memory write is initiated by a bus master, and performs an integrity check of the codeword using the previously stored error protection codes at a data sink when a read of the stored data is requested.

In various implementations, error protection codes are generated based on additional information that is associated with data in a storage location in order to protect the data. For example, utilizing address information in the formation of a codeword provides additional error detection capabilities. In general, a codeword includes a set of data bits (i.e., a data field) and a set of ECC checkbits (i.e., a checkbit field). The ECC checkbits are generated based on the content of the data field and address information associated with a location in storage of the codeword. Injecting errors into a transmitted codeword has been desirable to facilitate on-line testing of ECC logic of an integrated circuit (e.g., ECC logic of a system on a chip (SoC)). Error injection has typically been accomplished by dedicated hardware that inverts one or more bits of a codeword. Error injection for e2eECC is more complicated than error injection for ECC as an address component is also included in codeword generation.

Unfortunately, conventional error injection logic, which has been located in a critical timing path (to inject errors in an address), has lengthened the critical timing path. In general, error injection has conventionally required error injection logic to be capable of inverting each individual data bit and checkbit of a codeword, as well as address inputs to checkbit generation logic. In addition, specifying codeword bit(s) or address inputs to be inverted (to facilitate error injection) has required multiple registers and relatively expensive decoders to facilitate injection of desired error patterns. For example, in a system that employs eight checkbits, sixty-four data bits, and twenty-nine address bits, one-hundred one total input bits have required one-hundred one exclusive OR (XOR) gates at each bus master to facilitate error injection into one or more selected information bits.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 is a diagram of a relevant portion of an exemplary data structure that indicates which address bits and data bits are used to form codeword checkbits.

FIG. 4 is a diagram of an exemplary control register for injecting one or more errors into a codeword according to an embodiment of the present invention.

FIGS. 5 and 6 are tables that provide descriptions for exemplary fields for the control register of FIG. 4.

FIG. 7 is a flowchart for an exemplary process for injecting errors into a codeword according to an embodiment of the present invention.

DETAILED DESCRIPTION

Figure 1:
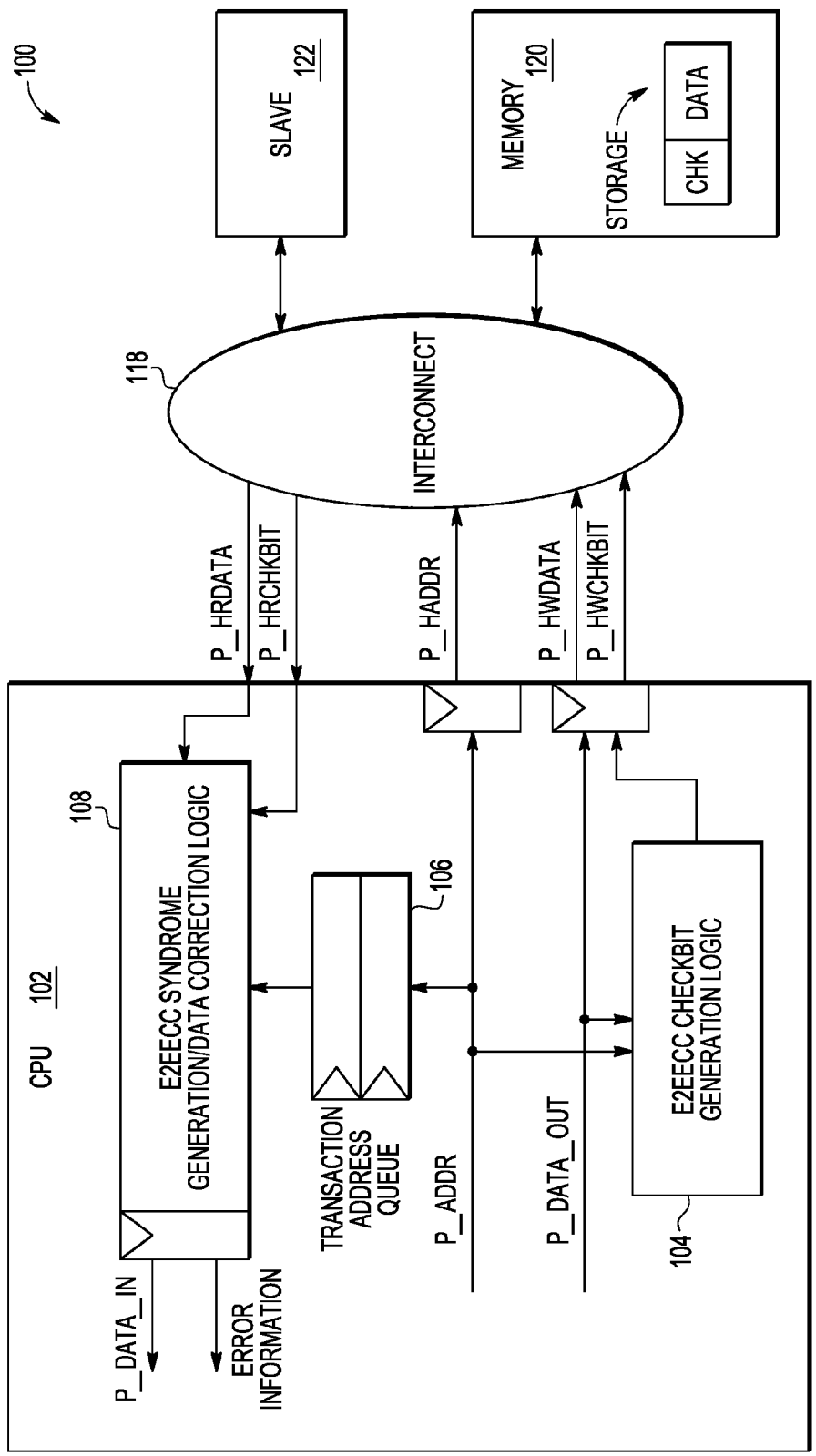
FIG. 1 is a diagram of a relevant portion of a system that employs end-to-end error correcting code (e2eECC).

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. As may be used herein, the term 'coupled' includes a direct electrical connection between elements or components and an indirect electrical connection between elements or components achieved using one or more intervening elements or components.

According to the present disclosure, techniques are employed that allow data errors and/or address errors to be emulated with checkbit inversion. The techniques may be implemented in processing circuitry executing software or hardware. According to the present disclosure, one or more checkbits of a codeword are selected for inversion prior to driving data for a write access by a bus master (e.g., a central processing unit (CPU), a digital signal processor (DSP), a direct memory access (DMA) controller, or other bus master type).

In various embodiments, neither data bit inversion nor address bit inversion is required for error injection into a codeword. In general, error injection is facilitated based solely on inversion of one or more selected checkbits. The checkbits to invert are determined by examining one or more columns of an employed data structure (e.g., a table such as a Hamming matrix) and desired error type (e.g., a single-bit error or a double-bit error). The disclosed techniques reduce the need for complex decoders and additional data and address control overhead that is required for conventional ECC error injection.

As alluded to above, e2eECC is structurally different than traditional ECC functionality (which is located at a memory unit) in that e2eECC provides for robust error detection capabilities from one endpoint of an information transfer to another endpoint, with temporary information storage in an intermediate storage component. As noted above, a conventional memory unit protected by ECC has generated and checked additional error parity information that is local to the memory unit to detect and correct errors associated with stored data in the memory unit. In contrast, e2eECC performs generation of error protection codes at a data generation source, sends the encoded data and error protection codes to intermediate storage when a memory write is initiated by a bus master, and performs a check of data integrity using the previously stored error protection codes at a data sink when a read of stored information is requested.

According to one aspect of the present disclosure, a technique for injecting errors into a codeword is disclosed. The technique includes determining whether one or more checkbits of the codeword are affected by one or more bit errors that are to be injected into the codeword. The one or more checkbits that are affected by only one of the one or more bit errors are inverted. The one or more checkbits that are affected by only two of the one or more bit errors are not inverted.

With reference to FIG. 1 a system 100 is illustrated that implements e2eECC. The system 100 includes a bus master (CPU 102) that includes e2eECC checkbit generation logic 104. The logic 104 generates checkbits (p_hwchkbit) based on an address (p_addr) and data (p_data_out) for a write access to a slave (memory 120 or slave 122), which is coupled to the CPU 102 via an interconnect 118. The generated checkbits (chk) are associated with the data (Data) and stored at the address in storage of the memory 120. In an embodiment, checkbit generation is based on an exclusive OR (XOR) tree that implements logic defined by a matrix. The matrix is composed of a table of input values and output checkbits that are affected by the input values. Inputs that are used in generating a specific checkbit are combined by XOR logic to generate a final checkbit value. The inputs that are selected to generate a specific checkbit are selected based on the particular type of error coding function utilized. For example, the error coding function may be represented by a Hamming matrix, an Hsiao matrix, or other coding function that supports the desired degree of error checking/correction. A matrix supporting single error correction and double error detection (SECDED) may be constructed using various known techniques.

For a read operation by CPU 102, an associated address is stored in a transaction address queue 106, as multiple read operations may be active at any given point in time. A read operation (including the read address) is transmitted (from the CPU 102) to the memory 120 over the interconnect 118, which returns read data (p_hrdata) and read checkbits (p_hrchkbit) to the CPU 102 in response to the read operation. The queued read address, the read data, and the read checkbits are provided to e2eECC syndrome generation/data correction logic 108, which returns error information and data (p_data_in). For example, logic 108 may be configured to correct single-bit errors and flag double-bit errors to invoke an exception that is processed by an error handling routine.

Figure 2:
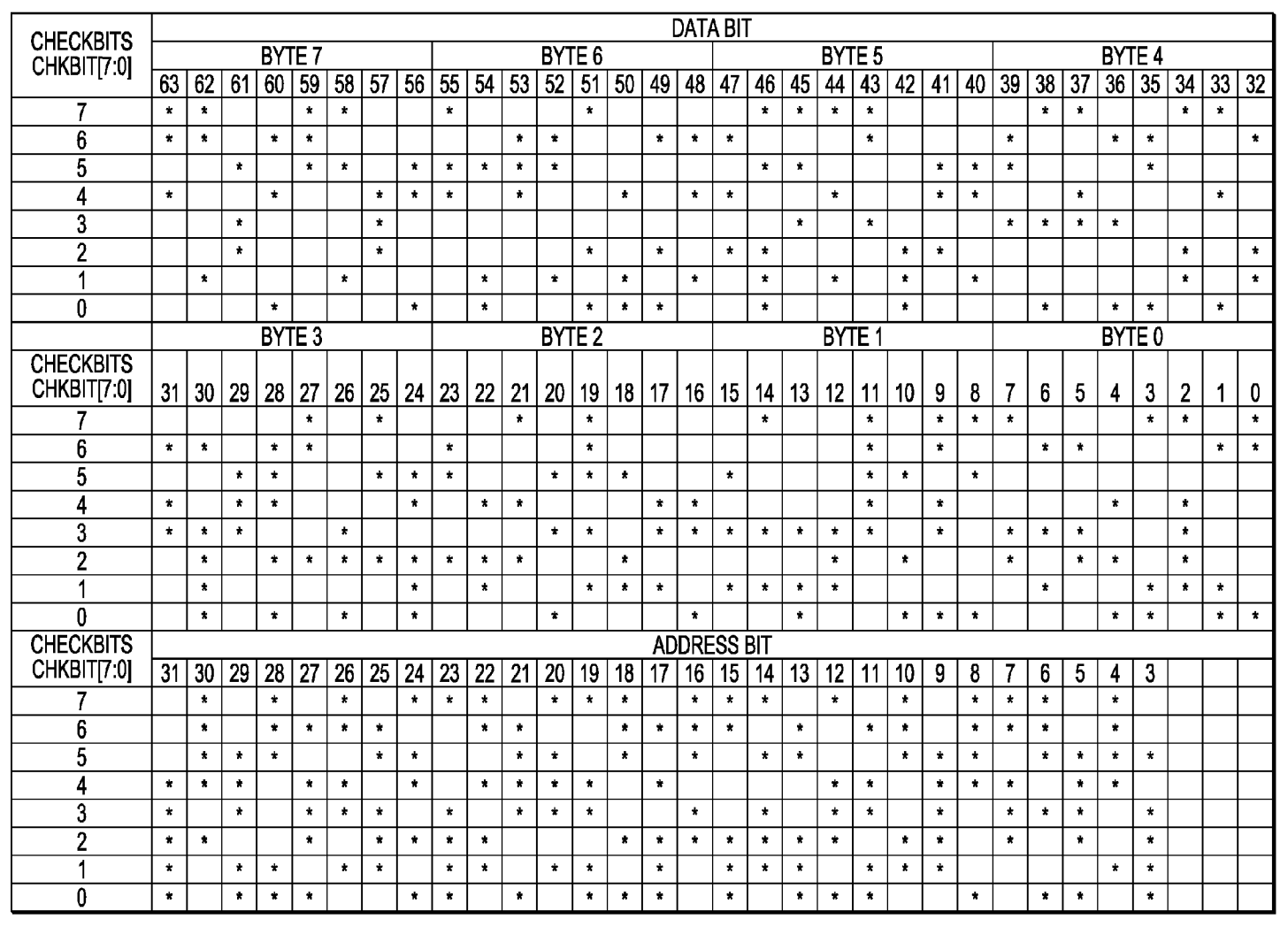

With reference to FIG. 2, an exemplary data structure (i.e., a Hamming matrix) of exclusive OR (XOR) functions that may be employed for e2eECC coding is illustrated. The data structure may, for example, be implemented as a table within or accessible to e2eECC checkbit generation logic 104. For example, with reference to the data structure of FIG. 2, checkbit [7] is determined by XORing data bits 63, 62, 59, 58, 55, 51, 46, 45, 44, 43, 38, 37, 34, 33, 27, 25, 21, 19, 14, 11, 9, 8, 7, 3, 2, and 0 (as indicated by a '*') with address bits 30, 28, 26, 24, 23, 22, 20, 19, 18, 16, 15, 14, 12, 10, 8, 7, 6, and 4. According to the data structure of FIG. 2, data bit '0' affects checkbits [7], [6], and [0]. Accordingly, a single-bit error for data bit '0' may be injected by inverting checkbits [7], [6], and [0], since the presence of an error in data bit '0' would cause those particular checkbits to see an opposite logic value from data bit '0' being driven into the XOR logic corresponding to the checkbit, thus causing the checkbit value to change to the opposite state. Also, according to the data structure of FIG. 2, data bit '1' affects checkbits [6], [1], and [0]. Accordingly, a double-bit error for data bits '0' and '1' may be injected by only inverting checkbits [7] and [1], as data bits '0' and '1' both have an affect on checkbits [6] and [0]. Since an error occurring in both data bits '1' and '0' would not have an affect on checkbits [7] and [1], checkbits [7] and [1] are not inverted when injecting the double-bit error for data bits '0' and '1'. That is, only checkbits that are affected by the double-bit error are inverted, while checkbits that are not affected by the desired double-bit error do not require inversion.

As another example, according to the data structure of FIG. 2, a single-bit error for data bit '63' may be injected by inverting checkbits [7], [6], and [4]. A single-bit error for address bit '31' may be injected by inverting checkbits [4], [3], [2], [1], and [0]. A double-bit error for data bit '63' and address bit '31' may therefore be injected by inverting checkbits [7], [6], [3], [2], [1], and [0], but not checkbit [4] as both data bit '63' and address bit '31' have an affect on checkbit [4]. As yet another example, according to the data structure of FIG. 2, a single-bit error for address bit '31' may be injected by inverting checkbits [4], [3], [2], [1], and [0]. A double-bit error for address bits '31' and '30' may be injected by only inverting checkbits [7], [6], [5], [3], [1], and [0], as address bits '31' and '30' both have an affect on checkbits [4] and [2].

It should be appreciated that the disclosed techniques, while focused on detecting and correcting single-bit errors and detecting (but not correcting) double-bit errors, may be extended to higher-order error coding schemes based on an implemented coding. Moreover, the coding depicted in the data structure of FIG. 2 is merely exemplary, as other coding may be employed with the techniques disclosed herein. It should be appreciated that the lower three address bits are not implemented in the data structure of FIG. 2, as the lower three address bits address a same memory location (in this case, a memory location composed of eight bytes). In general, error injection provides a way to test error recovery and portions of the error detection and correction logic by intentionally injecting errors into checkbit information driven onto an external bus during write operations. According to the present disclosure, no attempt is made to generate internal errors on read data (due to timing issues). However, it should be appreciated that errors may be intentionally injected into the checkbits to emulate a data, address, and/or checkbit error on external bus write cycles. Written data may then be read back to cause an error to be detected and/or corrected.

It should be noted that in contrast to conventional approaches, the disclosed techniques do not modify either data bit values or address signal values in order to accomplish error injection operations on one or more selected data bits or address signal values. Eliminating the need to control the driven or received values on address and data bits in order to accomplish error injection, eliminates the need for various complex logic and the associated penalties for increasing the number of logic levels in time critical paths.

Figure 3:
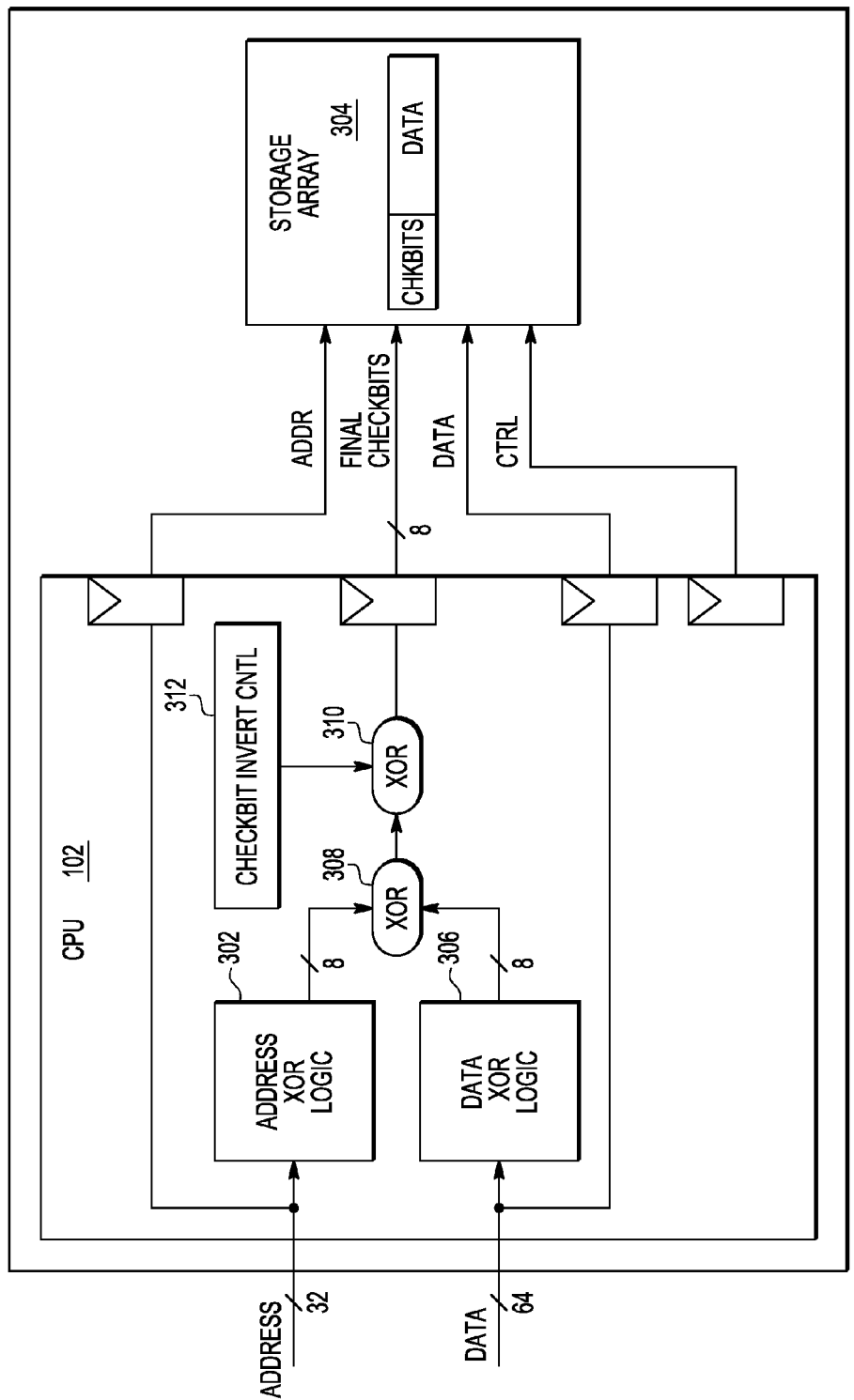
FIG. 3 is a diagram of a relevant portion of an exemplary system that employs end-to-end error correcting code (e2eECC) according to an embodiment of the present invention.

With reference to FIG. 3, a relevant portion of the CPU 102 of FIG. 1 is further illustrated. As shown in FIG. 3, address lines (Address) are coupled to inputs of an address XOR logic 302. The address lines are also bypassed directly to storage array 304, which is utilized to temporarily store data and associated checkbits (CHKBITS). As is also shown in FIG. 3, data lines are coupled to inputs of a data XOR logic 306. The data lines are also bypassed directly to the storage array 304. While thirty-two address lines and sixty-four data lines are illustrated, it should be appreciated that the disclosed techniques are applicable to systems with more or less than thirty-two address lines and more or less than sixty-four data lines. The logic 302 generates first checkbits for an address portion of a codeword and the logic 306 generates second checkbits for a data portion of the codeword. Outputs of the logic 302 and 306 are exclusive ORed (by XOR gate 308) to provide third checkbits. The third checkbits are coupled to an XOR gate 310, which is also coupled to an error control and status register (ECSR0) (Checkbit Invert Cntl) 312 that may be programmed to invert desired checkbits to emulate errors in one or more data bits and/or one or more address bits. Outputs of XOR gate 310 provide final checkbits that are stored at an address (Addr) specified on the bypassed address line. The final checkbits are associated with data (Data) on the bypassed data lines and are stored at the address (Addr) in storage array 304 responsive to control (Ctrl) signals provided by control logic (e.g., a bus interface unit (BIU)) of the CPU 102.

With reference to FIGS. 4-6, the ECSR0 312 includes four implemented fields (read checkbit (RCHKBIT), write control (WRC), invert control (INVC), and write checkbit/checkbit invert mask (WCHKBIT/CHKINVT)) and three reserved fields (i.e., bits 0:3, 12:15, and 20:23). ECSR0 312 may be configured to facilitate generation of a single or a multi-bit error injection operation on a next CPU data write to an external bus or for a series of error injection write operations to the external bus, using the WRC and INVC control fields. The WRCHKBIT/CHKINVT field controls which of the p_hwchkbit[7:0] outputs are affected. Control is provided to allow for either inverting a value of one or more of checkbit outputs (p_hwchkbit[7:0]) in hardware on one or more external write accesses using the INVC control field settings, or for software executed by processing circuitry to directly supply checkbit values to be used for external write accesses, using the WRC control field settings. In addition, the RCHKBIT field in the ESCR0 312 provides the raw (uncorrected) checkbit portion of a codeword read from memory. By utilizing the RCHKBIT field, the error injection hardware may be further checked for proper operation.

Software executed by processing circuitry may create emulated errors in the address and data portions of an external access based on the address locations used relative to those encoded and based on the combining of one or more emulated data bit errors in creating a new set of checkbit values using the error injection control capability. As one example, to emulate an address or data bit error, the checkbits affected by that address bit or data bit are all inverted. For example, to create a single-bit error for data bit '0' using checkbit inversion, checkbits '7', '6', and '0' may be inverted by setting the CHKINVT control field to binary '11000001'.

As another example, to create a double-bit error, the checkbits corresponding to the address or data bits to be marked with errors are inverted if, for a given checkbit, there is a '*' in only one of the rows of the bits in the data structure of FIG. 2 for the columns of the marked bits. For example, to create a double-bit error for data bits '0' and '1', checkbits '7' and '1' may be inverted by setting the CHKINVT control field to binary '10000010'. Based on the type of error to be emulated, one or more columns of the data structure (see FIG. 2) corresponding to the desired error to be injected are selected. A checkbit inversion mask that is based on the presence of entry information in the one or more columns of the matrix is then employed to determine which checkbit values require inverting prior to updating storage at the addressed location.

With reference to FIG. 7, a process 700 for injecting errors into a codeword is illustrated. The process 700 may, for example, be implemented within the CPU 102 by the e2eECC checkbit generation logic 104. The process 700 is initiated in block 702 at which point control transfers to block 704. In block 704, a bus master (e.g., the CPU 102 of FIGS. 1 and 3) determines whether one or more checkbits are affected by one or more bit errors that are to be injected into the codeword. Next, in block 706, the bus master inverts the one or more checkbits that are affected by only one of the one or more bit errors. Then, in block 708, the bus master refrains from inverting the one or more checkbits that are affected by only two of the one or more bit errors.

For example, the bus master may generate the one or more checkbits by exclusive ORing address bits and data bits based on a data structure (see FIG. 2). In general, the bus master examines the data structure to determine whether the one or more checkbits are affected by the one or more bit errors that are to be injected into the codeword. The bus master initiates storing the codeword (via a write operation) in a slave at the address. The bus master may then read the codeword from the slave and determine whether the codeword read from the slave has the one or more bit errors that were injected into the codeword. Following block 708, control transfers to block 710 where process 700 terminates.

Accordingly, techniques have been disclosed herein that facilitate error injection into a codeword based on checkbit inversion. A determination of which checkbits are to be inverted is based on examination of a data structure and which address and/or data bits require error injection. The techniques advantageously reduce the need for complex decoders and additional data and address control overhead and provide for robust error detection capability for memory and hardware errors (e.g., in safety and reliability applications) at reduced cost.

As may be used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in various embodiments of the present invention may be implemented using any combination of executed software, firmware or hardware. As a preparatory step to practicing the invention in software, code (whether software or firmware) according to a preferred embodiment will typically be stored in one or more machine readable storage mediums such as semiconductor memories such as read-only memories (ROMs), programmable ROMs (PROMs), etc., thereby making an article of manufacture in accordance with the invention. The article of manufacture containing the code is used by either executing the code directly from the storage device or by copying the code from the storage device into another storage device such as a random access memory (RAM), etc. An apparatus for practicing the techniques of the present disclosure could be one or more communication devices.

Although the invention is described herein with reference to specific embodiments, various modifications and changes can be made without departing from the scope of the present invention as set forth in the claims below. For example, the techniques disclosed herein are generally broadly applicable to systems that facilitate data communication. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of injecting errors into a codeword, comprising:
    generating, by a bus master, a codeword, wherein the codeword includes data bits and one or more checkbits;
    injecting, by the bus master, one or more bit errors into the codeword by modifying at least one of the one or more checkbits;
    determining, by the bus master, whether the one or more checkbits are affected by the one or more bit errors that are to be injected into the codeword; and
    inverting, by the bus master, the one or more checkbits that are affected by only one of the one or more bit errors, wherein the bus master does not invert the one or more checkbits that are affected by only two of the one or more bit errors.

2. The method of claim 1, wherein the codeword is an end-to-end error correcting code codeword.

3. The method of claim 2, further comprising:
    generating the one or more checkbits by exclusive ORing the data bits and address bits associated with the data bits based on a data structure.

4. The method of claim 2, further comprising:
    generating the one or more checkbits based on a data structure, wherein the determining, by the bus master, whether the one or more checkbits are affected by one or more bit errors that are to be injected into the codeword further comprises examining the data structure to determine whether the one or more checkbits are affected by the only one of the one or more bit errors that are to be injected into the codeword.

5. The method of claim 1, further comprising:
    storing, by the bus master, the codeword in a storage device at an address specified by address bits associated with the data bits;
    reading, by the bus master, the codeword from the storage device; and
    determining, by the bus master, whether the codeword read from the storage device has the one or more bit errors that were injected into the codeword by the bus master.

6. The method of claim 1, wherein the one or more bit errors are associated with the data bits.

7. The method of claim 1, wherein the one or more bit errors are associated with an address associated with the data bits.

8. The method of claim 1, wherein the one or more bit errors are associated with the data bits and an address associated with the data bits.

9. A method of injecting errors into a codeword, comprising:
    generating, by a bus master, a codeword, wherein the codeword includes data bits and one or more checkbits;
    injecting, by the bus master, one or more bit errors into the codeword by modifying at least one of the one or more checkbits;
    generating, by the bus master, from an address associated with the data bits first checkbits for the address;
    generating, by the bus master, from the data bits second checkbits for the data bits;
    exclusive ORing, by the bus master, individual bits of the first and second checkbits to generate third checkbits; and
    forming, by the bus master, final checkbits for the codeword by inverting individual bits of the third checkbits that are affected by only one bit error and not inverting individual bits of the third checkbits that are affected by two bit errors, wherein the final checkbits correspond to the one or more checkbits.

10. A system configured to inject errors into a codeword, comprising:
    an interconnect;
    a slave coupled to the interconnect; and
    a bus master coupled to the interconnect, wherein the bus master is configured to generate a codeword that includes data bits and one or more checkbits and inject one or more bit errors into the codeword by modifying at least one of the one or more checkbits, and wherein the bus master is further configured to determine whether the one or more checkbits are affected by the one or more bit errors that are to be injected into the codeword and invert the one or more checkbits that are affected by only one of the one or more bit errors, where the bus master does not invert the one or more checkbits that are affected by only two of the one or more bit errors.

11. The system of claim 10, wherein the codeword is an end-to-end error correcting code codeword.

12. The system of claim 11, wherein the one or more checkbits are generated by exclusive ORing the data bits and address bits associated with the data bits based on a data structure.

13. The system of claim 11, wherein the one or more checkbits are generated based on a data structure and the data structure is examined to determine whether the one or more checkbits are affected by the only one of the one or more bit errors that are to be injected into the codeword.

14. The system of claim 10, wherein the bus master is further configured to store the codeword in a storage device at an address specified by address bits associated with the data bits, read the codeword from the storage device, and determine whether the codeword read from the storage device has the one or more bit errors that were injected into the codeword.

15. The system of claim 10, wherein the one or more bit errors are associated with the data bits.

16. The system of claim 10, wherein the one or more bit errors are associated with an address associated with the data bits.

17. The system of claim 10, wherein the one or more bit errors are associated with the data bits and an address associated with the data bits.

18. A system configured to inject errors into a codeword, comprising:
    an interconnect;
    a slave coupled to the interconnect; and
    a bus master coupled to the interconnect, wherein the bus master is configured to generate a codeword that includes data bits and one or more checkbits and inject one or more bit errors into the codeword by modifying at least one of the one or more checkbits, and wherein the bus master is further configured to generate from an address associated with the data bits first checkbits for the address, generate from the data bits second checkbits for the data bits, exclusive OR individual bits of the first and second checkbits to generate third checkbits, and form final checkbits for the codeword by inverting individual bits of the third checkbits that are affected by only one bit error and not inverting individual bits of the third checkbits that are affected by only two bit errors, where the final checkbits correspond to the one or more checkbits.

19. A bus master configured to inject errors into a codeword, comprising:

logic configured to generate a codeword, wherein the codeword includes data bits and one or more checkbits;

logic configured to inject one or more bit errors into the codeword by modifying at least one of the one or more checkbits;

logic configured to determine whether the one or more checkbits are affected by the one or more bit errors that are to be injected into the codeword; and logic configured to invert the one or more checkbits that are affected by only one of the one or more bit errors, where the logic does not invert the one or more checkbits that are affected by only two of the one or more bit errors.

20. The bus master of claim 19, wherein the bus master is one of a central processing unit, a digital signal processor, and a direct memory access controller.

* * * * *